United States Patent [19]
Ronne et al.

[11] Patent Number: 6,066,409
[45] Date of Patent: May 23, 2000

[54] ELECTROCHEMICAL FUEL CELL STACK WITH IMPROVED REACTANT MANIFOLDING AND SEALING

[75] Inventors: Joel A. Ronne, Vancouver; Boguslaw M. Wozniczka, Coquitlam; Clarence Y. Chow, Vancouver; Henry H. Voss, West Vancouver, all of Canada

[73] Assignee: Ballard Power Systems Inc., Burnaby, Canada

[21] Appl. No.: 09/116,270

[22] Filed: Jul. 16, 1998

Related U.S. Application Data

[60] Provisional application No. 60/052,713, Jul. 16, 1997.

[51] Int. Cl.$^7$ .................................................. H01M 2/14
[52] U.S. Cl. ............................. 429/39; 429/32; 429/36; 429/38
[58] Field of Search .................................. 429/32, 36, 38, 429/39

[56] References Cited

U.S. PATENT DOCUMENTS

| | | | |
|---|---|---|---|
| 5,238,754 | 8/1993 | Yasuo et al. | 429/39 |
| 5,252,409 | 10/1993 | Akagi | 429/32 |
| 5,252,410 | 10/1993 | Wilkinson et al. | 429/33 |
| 5,419,980 | 5/1995 | Okamoto et al. | 429/32 |
| 5,432,021 | 7/1995 | Wilkinson et al. | 429/17 |
| 5,445,904 | 8/1995 | Kaufman | 429/39 |
| 5,484,666 | 1/1996 | Gibb et al. | 429/34 |
| 5,514,486 | 5/1996 | Wilson | 429/30 |
| 5,514,487 | 5/1996 | Washington et al. | 429/39 |
| 5,534,362 | 7/1996 | Okamoto et al. | 429/32 |
| 5,686,199 | 11/1997 | Cavalca et al. | 429/30 |
| 5,736,269 | 4/1998 | Okamoto et al. | 429/38 |
| 5,750,281 | 5/1998 | Washington et al. | 429/39 |
| 5,906,898 | 5/1999 | Pondo | 429/35 |

FOREIGN PATENT DOCUMENTS

WO 97/27639  7/1997  WIPO .

*Primary Examiner*—Bruce F. Bell
*Attorney, Agent, or Firm*—McAndrews, Held & Malloy, Ltd.

[57] ABSTRACT

An electrochemical fuel cell stack with improved reactant manifolding and sealing includes a pair of separator plates interposed between adjacent membrane electrode assemblies. Passageways fluidly interconnecting the anodes to a fuel manifold and interconnecting the cathodes to an oxidant manifold are formed between adjoining non-active surfaces of the pairs of separator plates. The passageways extend through one or more ports penetrating the thickness of one of the plates thereby fluidly connecting the manifold to the opposite active surface of that plate, and the contacted electrode. The non-active surfaces of adjoining separator plates in a fuel cell stack cooperate to provide passageways for directing both reactants from respective stack fuel and oxidant supply manifolds to the appropriate electrodes. The fuel and oxidant reactant streams passageways are fluidly isolated from each other, although they both traverse adjoining non-active surfaces of the same pair of plates. The present manifolding configuration simplifies the sealing mechanisms associated with the stack manifolds because reactant streams are not directed between the separator plates and resilient MEA seals. Coolant passages may also be conveniently provided between adjoining non-active surfaces of the pairs of separator plates.

13 Claims, 4 Drawing Sheets

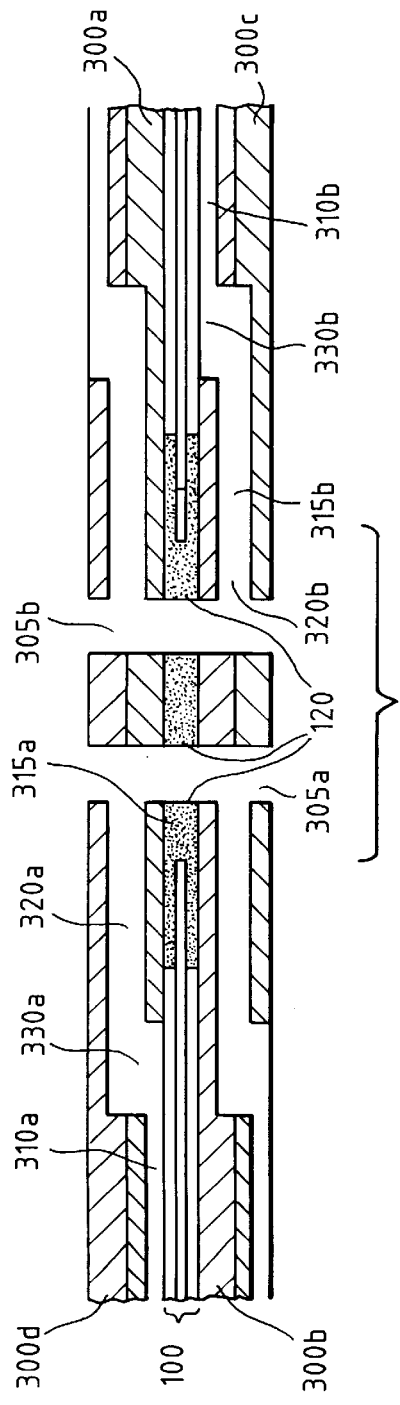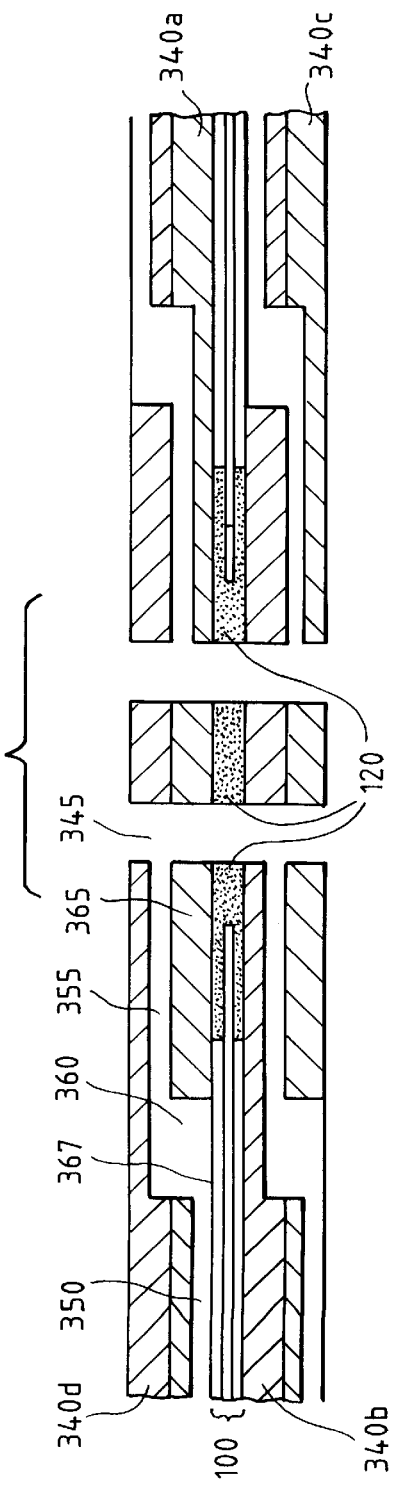

ELECTROCHEMICAL FUEL CELL STACK WITH IMPROVED REACTANT MANIFOLDING AND SEALING

CROSS-REFERENCE TO RELATED APPLICATION

This application relates to and claims priority benefits from U.S. Provisional Patent application Ser. No. 60/052,713 filed Jul. 16, 1997, which is incorporated by reference herein in its entirety.

TECHNICAL FIELD

The present invention relates to electrochemical fuel cell stacks. In particular, the invention provides an electrochemical solid polymer fuel cell stack with improved reactant manifolding and sealing.

BACKGROUND

Electrochemical fuel cells convert reactants, namely fuel and oxidant fluid streams, to generate electric power and reaction products. Electrochemical fuel cells employ an electrolyte disposed between two electrodes, namely a cathode and an anode. The electrodes generally each comprise a porous, electrically conductive sheet material and an electrocatalyst disposed at the interface between the electrolyte and the electrode layers to induce the desired electrochemical reactions. The location of the electrocatalyst generally defines the electrochemically active area Solid polymer fuel cells typically employ a membrane electrode assembly ("MEA") consisting of a solid polymer electrolyte or ion exchange membrane disposed between two electrode layers. The membrane, in addition to being ion conductive (typically proton conductive) material, also acts as a barrier for isolating the reactant streams from each other.

The MEA is typically interposed between two separator plates which are substantially impermeable to the reactant fluid streams. The plates act as current collectors and provide support for the MEA. Surfaces of the separator plates which contact an electrode are referred to as active surfaces. The separator plates may have grooves or open-faced channels formed in one or both surfaces thereof, to direct the fuel and oxidant to the respective contacting electrode layers, namely, the anode on the fuel side and the cathode on the oxidant side. Such separator plates are known as flow field plates, with the channels, which may be continuous or discontinuous between the reactant inlet and outlet, being referred to as flow field channels. The flow field channels assist in the distribution of the reactant across the electrochemically active area of the contacted porous electrode. In some solid polymer fuel cells, flow field channels are not provided in the active surfaces of the separator plates, but the reactants are directed through passages in the porous electrode layer. Such passages may, for example, include channels or grooves formed in the porous electrode layer or may be just be the interconnected pores or interstices of the porous material.

In a fuel cell stack, a plurality of fuel cells are connected together, typically in series, to increase the overall output power of the assembly. In such an arrangement, an active surface of the separator plate faces and contacts an electrode and a non-active surface of the plate may face a non-active surface of an adjoining plate. In some cases, the adjoining non-active separator plates may be bonded together to form a laminated plate. Alternatively both surfaces of a separator plate may be active. For example, in series arrangements, one side of a plate may serve as an anode plate for one cell and the other side of the plate may serve as the cathode plate for the adjacent cell, with the separator plate functioning as a bipolar plate. Such a bipolar plate may have flow field channels formed on both active surfaces.

The fuel stream which is supplied to the anode separator plate typically comprises hydrogen. For example, the fuel stream may be a gas such as substantially pure hydrogen or a reformate stream containing hydrogen. Alternatively, a liquid fuel stream such as aqueous methanol may be used. The oxidant stream, which is supplied to the cathode separator plate, typically comprises oxygen, such as substantially pure oxygen, or a dilute oxygen stream such as air.

A fuel cell stack typically includes inlet ports and supply manifolds for directing the fuel and the oxidant to the plurality of anodes and cathodes respectively. The stack often also includes an inlet port and manifold for directing a coolant fluid to interior passages within the stack to absorb heat generated by the exothermic reaction in the fuel cells. The stack also generally includes exhaust manifolds and outlet ports for expelling the unreacted fuel and oxidant gases, as well as an exhaust manifold and outlet port for the coolant stream exiting the stack. The stack manifolds, for example, may be internal manifolds, which extend through aligned openings formed in the separator layers and MEAs, or may comprise external or edge manifolds, attached to the edges of the separator layers.

Conventional fuel cell stacks are sealed to prevent leaks and inter-mixing of the fuel and oxidant streams. Fuel cell stacks typically employ fluid tight resilient seals, such as elastomeric gaskets between the separator plates and membranes. Such seals typically circumscribe the manifolds and the electrochemically active area Sealing is effected by applying a compressive force to the resilient gasket seals.

Fuel cell stacks are compressed to enhance sealing and electrical contact between the surfaces of the plates and the MEAs, and between adjoining plates. In conventional fuel cell stacks, the fuel cell plates and MEAs are typically compressed and maintained in their assembled state between a pair of end plates by one or more metal tie rods or tension members. The tie rods typically extend through holes formed in the stack end plates, and have associated nuts or other fastening means to secure them in the stack assembly. The tie rods may be external, that is, not extending through the fuel cell separator plates and MEAs, however, external tie rods can add significantly to the stack weight and volume. It is generally preferable to use one or more internal tie rods which extend between the stack end plates through openings in the fuel cell separator plates and MEAs as, for example, described in U.S. Pat. No. 5,484,666. Typically springs, hydraulic or pneumatic pistons, pressure pads or other resilient compressive means are utilized to cooperate with the tie rods and end plates to urge the two end plates towards each other to compress the fuel cell stack components.

The passageways which fluidly connect each electrode to the appropriate stack supply and/or exhaust manifolds typically comprise one or more open-faced fluid channels formed in the active surface of the separator plate, extending from a reactant manifold to the area of the plate which corresponds to the electrochemically active area of the contacted electrode. In this way, for a flow field plate, fabrication is simplified by forming the fluid supply and exhaust channels on the same face of the plate as the flow field channels. However, such channels may present a problem for the resilient seal which is intended to fluidly isolate the other electrode (on the opposite side of the ion exchange membrane) from this manifold. Where a seal on the other side of the membrane crosses over open-faced channels extending from the manifold, a supporting surface is required to bolster the seal and to prevent the seal from leaking and/or sagging into the open-faced channel. One solution adopted in conventional separator plates is to insert a bridge member which spans the open-faced channels underneath the resilient seal. The bridge member preferably provides a sealing surface which is flush with the sealing surface of the separator plate so that a gasket-type seal on the other side of the membrane is substantially uniformly compressed to provide a fluid tight seal. The bridge member also prevents the gasket-type seal from sagging into the open-faced channel and restricting the fluid flow between the manifold and the electrode. Instead of bridge members, it is also known to use metal tubes or other equivalent devices for providing a continuous sealing surface around the electrochemically active area of the electrodes (see, for example, U.S. Pat. No. 5,750,281), whereby passageways, which fluidly interconnect each electrode to the appropriate stack supply or exhaust manifolds, extend laterally within the thickness of a separator or flow field plate, substantially parallel to its major surfaces.

Conventional bridge members are affixed to the separator plates after the plates have been milled or molded to form the open-faced fluid channels. One problem with this solution is that separate bridge members add to the number of separate fuel cell components which are needed in a fuel cell stack. Further, the bridge members are typically bonded to the separator plates, so care must be exercised to ensure that the relatively small bridge members are accurately installed and that the bonding agent does not obscure the manifold port. It is also preferable to ensure that the bridge members are installed substantially flush with the sealing surface of the separator plate. Accordingly, the installation of conventional bridge members on separator plates adds significantly to the fabrication time and cost for manufacturing separator plates for fuel cell assemblies. Therefore, it is desirable to obviate the need for such bridge members, and to design an electrochemical fuel cell stack so that the fluid reactant streams are not directed between the separator plates and MEA seals.

SUMMARY OF THE INVENTION

In the present approach, passageways fluidly interconnecting an anode to a fuel manifold and interconnecting a cathode to an oxidant manifold in an electrochemical fuel cell stack are formed between the non-active surfaces of a pair of adjoining separator plates. The passageways then extend through one or more ports penetrating the thickness of one of the plates thereby fluidly connecting the manifold to the opposite active surface of that plate, and the contacted electrode. Thus, the non-active surfaces of adjoining separator plates in a fuel cell stack can cooperate to provide passageways for directing both reactants from respective fuel and oxidant manifolds to the appropriate electrodes. Of course the fuel and oxidant reactant streams are fluidly isolated from each other, even though they are directed between adjoining non-active surfaces of the same pair of plates. Coolant passages may also be conveniently provided between the non-active surfaces of adjoining separator plates.

An electrochemical fuel cell stack with improved reactant manifolding and sealing comprises:

(a) a plurality of membrane electrode assemblies each comprising an anode, a cathode, and an ion exchange membrane interposed between the anode and cathode;

(b) a pair of separator plates interposed between adjacent pairs of the plurality of membrane electrode assemblies, the pair of separator plates comprising:
   an anode plate having an active surface contacting an anode, and an oppositely facing non-active surface, and
   a cathode plate having an active surface contacting a cathode, and an oppositely facing non-active surface which adjoins the non-active surface of the anode plate; and (c) a fuel supply manifold for directing a fuel stream to one, or preferably more, of the anodes, and an oxidant supply manifold for directing an oxidant stream to one, or preferably more, of the cathodes, and fuel and oxidant stream passageways fluidly connecting the fuel and oxidant supply manifolds to an anode and a cathode, respectively,
   wherein each of the fuel and oxidant stream passageways traverses a portion of the adjoining non-active surfaces of a pair of the separator plates.

The electrochemical fuel cell stack may optionally further comprise an oxidant exhaust manifold for directing an oxidant stream from one, or preferably more, of the cathodes, and/or a fuel exhaust manifold for directing a fuel stream from one, or preferably more, of the anodes. In preferred embodiments, reactant stream passageways fluidly interconnecting the reactant exhaust manifolds to the electrodes also traverse a portion of adjoining non-active surfaces of a pair of the separator plates.

In further embodiments passages for a coolant may also be formed between cooperating non-active surfaces of adjoining anode and cathode plates, or one or more coolant channels may be formed in the active surface of at least one of the cathode and/or the anode separator plates. In an operating stack, a coolant may be actively directed through the cooling channels or passages by a pump or fan, or alternatively, the ambient environment may passively absorb the heat generated by the electrochemical reaction within the fuel cell stack.

The separator plates may be flow field plates wherein the active surfaces have reactant flow field channels formed therein, for distributing reactant streams from the supply manifolds across at least a portion of the contacted electrodes.

In the present approach, passageways for both the fuel and oxidant reactant streams extend between adjoining non-active surfaces of the same pair of plates, but the passageways are fluidly isolated from each other. To improve the sealing around the reactant stream passageways located between adjoining non-active surfaces of the separator plates, the fuel cell stack may further comprise one or more gasket seals interposed between the adjoining non-active surfaces. Alternatively, or in addition to employing gasket seals, adjoining separator plates may be adhesively bonded together. To improve the electrical conductivity between the adjoining plates, the adhesive is preferably electrically conductive. Other known methods of bonding and sealing the adjoining separator plates may be employed.

In any of the embodiments of an electrochemical fuel cell stack described above, the manifolds may be selected from various types of stack manifolds, for example internal manifolds comprising aligned openings formed in the stacked membrane electrode assemblies and separator plates, or external manifolds extending from an external edge face of the fuel cell stack.

As used herein, adjoining components are components which are in contact with one another, but are not necessarily bonded or adhered to one another. Thus, the terms adjoin and contact are intended to be synonymous.

BRIEF DESCRIPTION OF THE DRAWINGS

The advantages, nature and additional features of the invention will become more apparent from the following description, together with the accompanying drawings, in which:

FIGS. 3A and 3B are partial sectional views of an MEA interposed between two pairs of separator plates illustrating a fluid connection between the electrodes and the manifolds via passageways formed between adjoining non-active surfaces the pairs of separator plates.

DETAILED DESCRIPTION OF THE PREFERRED EMBODIMENTS

Figure 1:
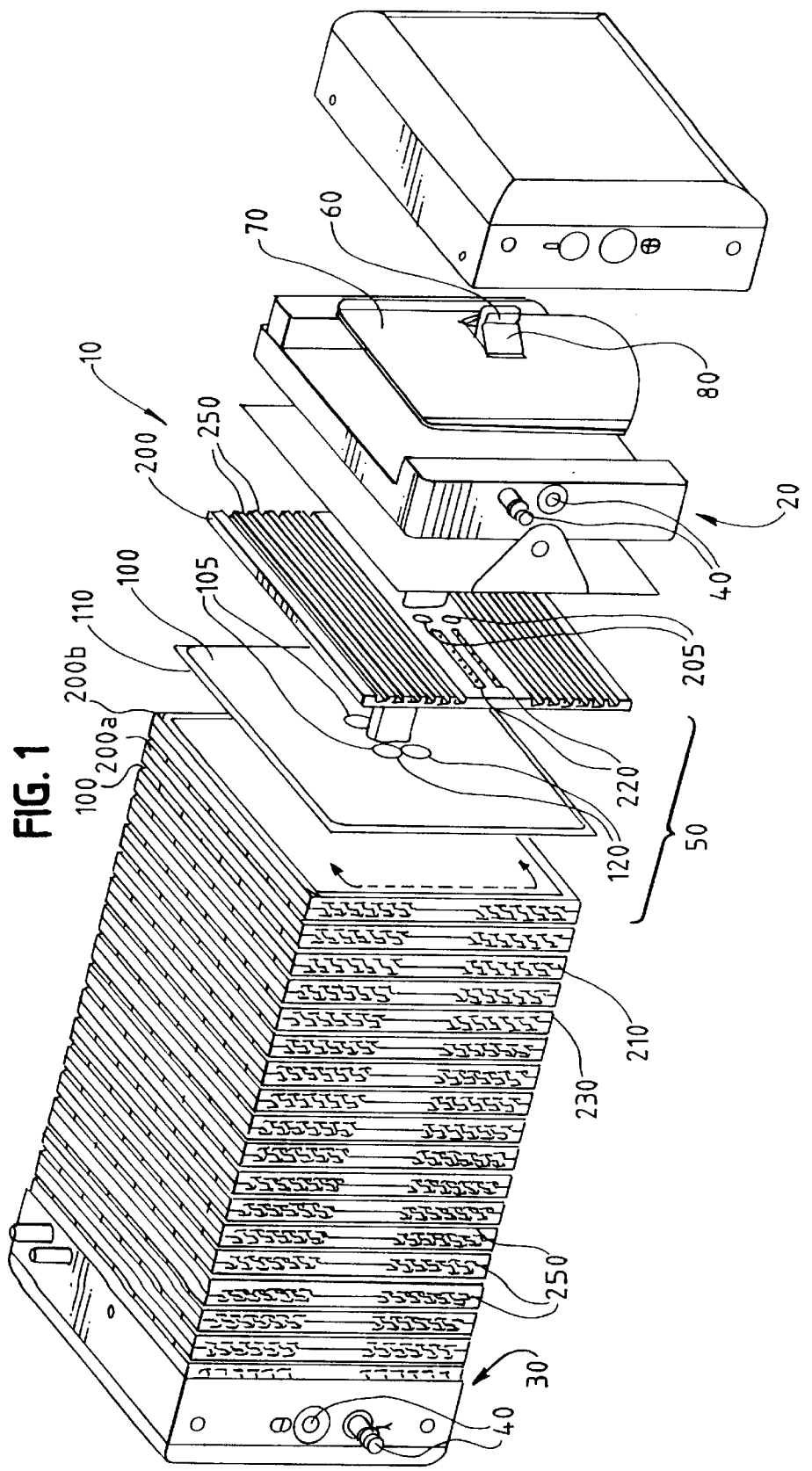
FIG. 1 is a partially exploded perspective view of an embodiment of an electrochemical solid polymer fuel cell stack with improved reactant manifolding and sealing.

FIG. 1 illustrates a solid polymer electrochemical fuel cell stack 10, including a pair of end plate assemblies 20 and 30, and a plurality of stacked fuel cell assemblies 50, each comprising an MEA 100, and a pair of separator plates 200. Between each adjacent pair of MEAs 100 in the stack, there are two separator plates 200 which have adjoining surfaces. An adjoining pair of separator plates are shown as 200a and 200b. A tension member 60 extends between end plate assemblies 20 and 30 to retain and secure stack 10 in its assembled state. Spring 70 with clamping members 80 grip an end of tension member 60 to apply a compressive force to fuel cell assemblies 50 of stack 10.

Fluid reactant streams are supplied to and exhausted from internal manifolds and passages in stack 10 via inlet and outlet ports 40 in end plate assemblies 20 and 30. Aligned internal reactant manifold openings 105 and 205 in MEAs 100 and separator plates 200, respectively, form internal reactant manifolds extending through stack 10.

In the illustrated embodiment, perimeter seal 10 is provided around the outer edge of both sides of MEA 100. Manifold seals 120 circumscribe internal reactant manifold openings 105 on both sides of MEA 100. When stack 10 is secured in its assembled, compressed state, seals 110 and 120 cooperate with the adjacent pair of plates 200 to fluidly isolate fuel and oxidant reactant streams in internal reactant manifolds and passages, thereby isolating one reactant stream from the other and preventing the streams from leaking from stack 10.

As illustrated in FIG. 1, each MEA 100 is positioned between the active surfaces of two separator plates 200. Each separator plate 200 has flow field channels 210 on the active surface thereof (which contacts the MEA) for distributing fuel or oxidant fluid streams to the active area of the contacted electrode of the MEA 100. In the embodiment illustrated in FIG. 1, flow field channels 210 on the active surface of plates 200 are fluidly connected to internal reactant manifold openings 205 in plate 200 via supply/exhaust passageways comprising channels 220 partially shown) located on the non-active surface of separator plate 200 and ports 230 extending through (i.e. penetrating the thickness) of plate 200. One end of port 230 is open to the active area of separator plate 200 and the other end of port 230 is open to reactant channel 220. With the illustrated manifold configuration, neither perimeter seals 110 nor manifold seals 120 bridge any open-faced channels formed on the adjoining active surface of plates 200, thus the seals on both sides of MEA 100 are completely supported by the separator plate material.

In the illustrated embodiment, separator plates 200 have a plurality of open-faced parallel channels 250 formed in the non-active surface thereof. Channels 250 on adjoining pairs of plates 200 cooperate to form passages extending laterally between opposing edge faces of stack 10 (perpendicular to the stacking direction). A coolant stream, such as air, may be directed through these passages to remove heat generated by the exothermic electrochemical reactions which are induced inside the fuel cell stack.

Figure 2B:
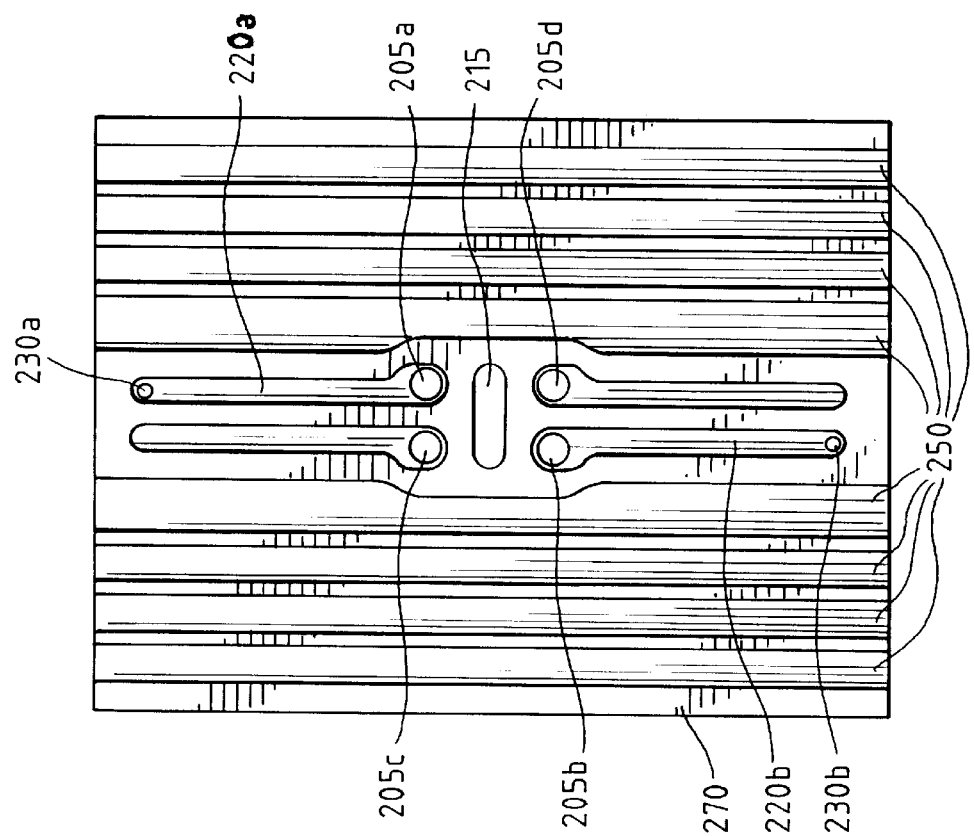
FIGS. 2A and 2B are plan views of the active and non-active surfaces, respectively, of a separator plate of the fuel cell stack of FIG. 1.
Figure 2A:
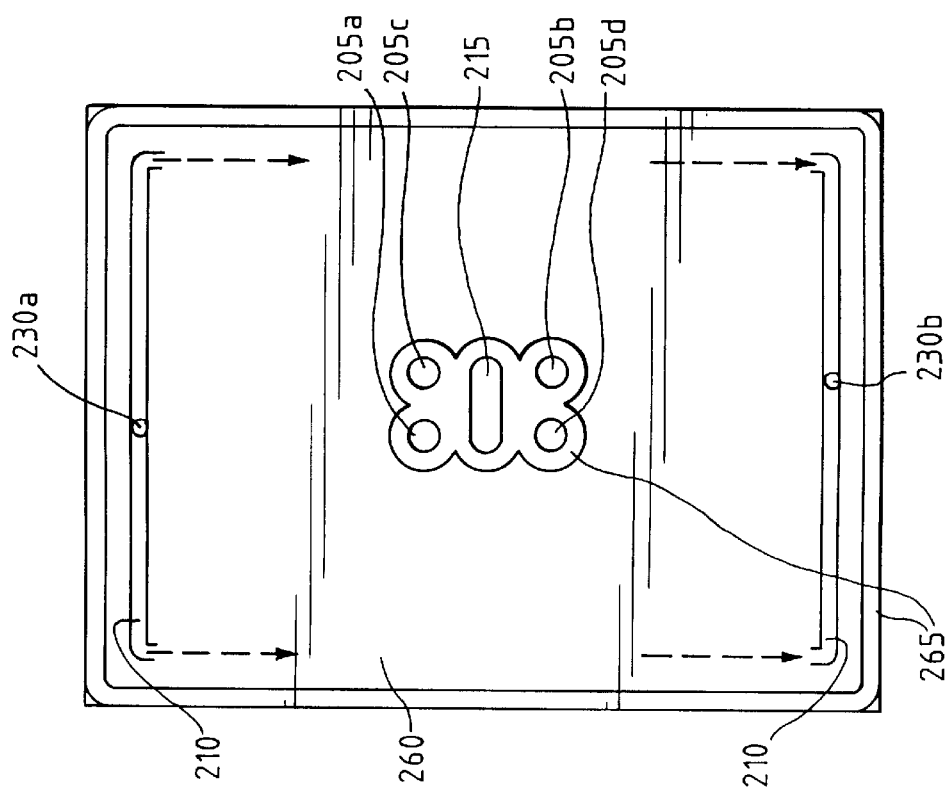

FIGS. 2A and 2B are plan views of the active and non-active surfaces, respectively, of a separator plate 200 of the fuel cell stack of FIG. 1; separator plate 200 has openings extending therethrough, namely reactant supply and exhaust manifold openings 205a–d, and tie rod opening 215. FIG. 2A depicts the active surface 260 of separator plate 200 which, in a fuel cell stack contacts an MEA. Flow field channels, only a portion of which are shown (for clarity) as 210, distribute a reactant stream, to the contacted electrode layer of the MEA. Flow field channels may comprise one or more continuous or discontinuous channels between the reactant inlet and outlet ports 230a and 230b. A reactant stream is supplied to and exhausted from flow field channels 210 from the reverse non-active surface 270 of the plate 200 via ports 230a and 230b which penetrate the thickness of plate 200. FIG. 2B depicts the reverse, non-active surface 270 of separator plate 200. FIG. 2B shows how ports 230a and 230b are fluidly connected to reactant channels 220a and 220b respectively, which in turn are fluidly connected to supply and exhaust manifold openings 205a and 205b. Adjoining pairs of separator plates may be substantially identical. Thus, in a stack, supply and exhaust manifold openings 205c and 205d may be fluidly connected to the active surface of an adjoining separator plate via analogous channels 220c and 220d (not shown) and ports 230c and 230d (not shown) formed in that adjoining plate. Alternatively the non-active surface of the adjoining plate could be substantially planar, but it would cooperate with the channels 220 formed in the illustrated plate to form the necessary reactant supply and exhaust channels (see FIG. 3B below).

FIG. 2A also illustrates how grooves 265 in the active surface 260 of plate 200 provide continuous sealing surfaces around flow field active area 260. In particular, grooves 265 provide a depressed surface for receiving seal 110 around the perimeter edge and around the manifold openings 205a–d.

FIG. 2B also depicts an embodiment in which multiple coolant channels 250 are also formed in the non-active surface 270 of plate 200. Thus, in the illustrated embodiment, channels for both reactants and for a coolant traverse a portion of the non-active surface of separator plate 200. Depicted coolant channels 250 are suitable for an open cooling system which uses air as the coolant. For example, cooling air may be blown through the channels by a fan or blower. For low power fuel cells such as portable units, it may be possible to operate a fuel cell stack without a fan by relying only on the transfer of heat from the surfaces of cooling channels 250 to the ambient air. A closed cooling system (not shown) typically employs stack coolant manifolds, which could be external or else similar to the internal reactant manifolds, fluidly connected to an array of coolant channels.

FIGS. 3A and 3B show partial cross-sectional views of embodiments of portions of a fuel cell stack which employ improved manifolding, so that continuous sealing surfaces circumscribing the flow field area and internal fluid manifolds on the separator plates may be provided. Internal manifolds are provided by aligned openings in the separator plates 300 and MEA 100, as shown for example in FIG. 3A, by fuel manifold 305a and oxidant manifold 305b.

With reference to FIG. 3A, the fuel cell stack comprises anode separator plates 300a and 300c, and cathode separator plates 300b and 300d. An MEA 100 with seals 120 is interposed between the active surfaces of anode and cathode separator plates 300a and 300b. The anode of the MEA 100 contacts anode separator plate 300a and the cathode of the MEA 100 contacts cathode separator plate 300b. FIG. 3A illustrates the fluid connection between flow field channels 310a, and 310b, and respective manifolds 305a and 305b.

Resilient seals 120 isolate the MEA cathode from fuel manifold 305a and the MEA anode from oxidant manifold 305b, thereby preventing inter-mixing of the reactant fluids. Seals 120 are compressed between separator plates 300a and 300b. Portions 315a and 315b of separator plates 300a, 300b respectively provide substantially rigid support for seals 120. No separate bridging members are required because the seals 120 do not span open-faced channels on the adjacent plate.

FIG. 3A illustrates an embodiment of the invention in which open-faced reactant channels, provided on both of the non-active surfaces of adjoining separator plates 300a and 300d, cooperate to provide a fuel passageway 320a. Fuel passageway 320a extends from manifold 305a to the anode via a plate opening or port 330a which extends through the thickness of plate 300a to fuel flow field channel 310a. By providing open-faced channels in both of the adjoining non-active surfaces, a deeper fuel passageway 320a may be provided. An advantage of deeper fluid passageways is that deeper channels reduce energy losses associated with conveying the reactant fluids through reactant channels. Similarly, open-faced channels formed in the non-active surfaces of separator plates 300b and 300c cooperate to provide an oxidant passageway 320b, for fluidly connecting the oxidant flow field channel 310b and the contacted cathode to oxidant manifold 305b.

FIG. 3B is very similar to FIG. 3A, but illustrates an embodiment in which open-faced reactant channels, provided the non-active surfaces of a separator plate cooperate with a substantially planar portion of the non-active surface of the adjoining plates to provide the passageways. For example, an open-faced channel 355 is formed in the non-active surface of separator plate 340d, which cooperates with a substantially planar portion of the non-active surface of plate 340a to provide a fuel passageway connecting fuel manifold 345 to fuel flow field channel 350 via port opening 360. Similar cooperation of the non-active surfaces plates 340b and 340c provides other such passageways. An advantage of this embodiment is that portions of the separator plates which support some of the MEA seals 120 (for example portion 365 of plate 240a in FIG. 3B) have substantially the same thickness as the separator plate 340a, thereby providing increased rigidity and improved resistance to deflection. Another feature of the embodiment illustrated in FIG. 3B is fluid impermeable material 367 which superposes the surface of the MEA 100 opposite to manifold port opening 360. This can protect the MEA electrodes and membrane from damage which may be caused by the impinging reactant stream entering flow field channel 350 via port 360. The fluid impermeable material may be the same material which is employed for seal 120. Preferably the fluid impermeable layer is bonded to the surface of MEA 100 or is impregnated into the porous electrode. Fluid impermeable material 367 may extend all the way from the region opposite manifold port opening 360 to seal 120. Thus the material for fluid impermeable layer 367 can be conveniently applied to MEA 100 at the same time the sealant material is deposited for seal 120.

Figure 4:
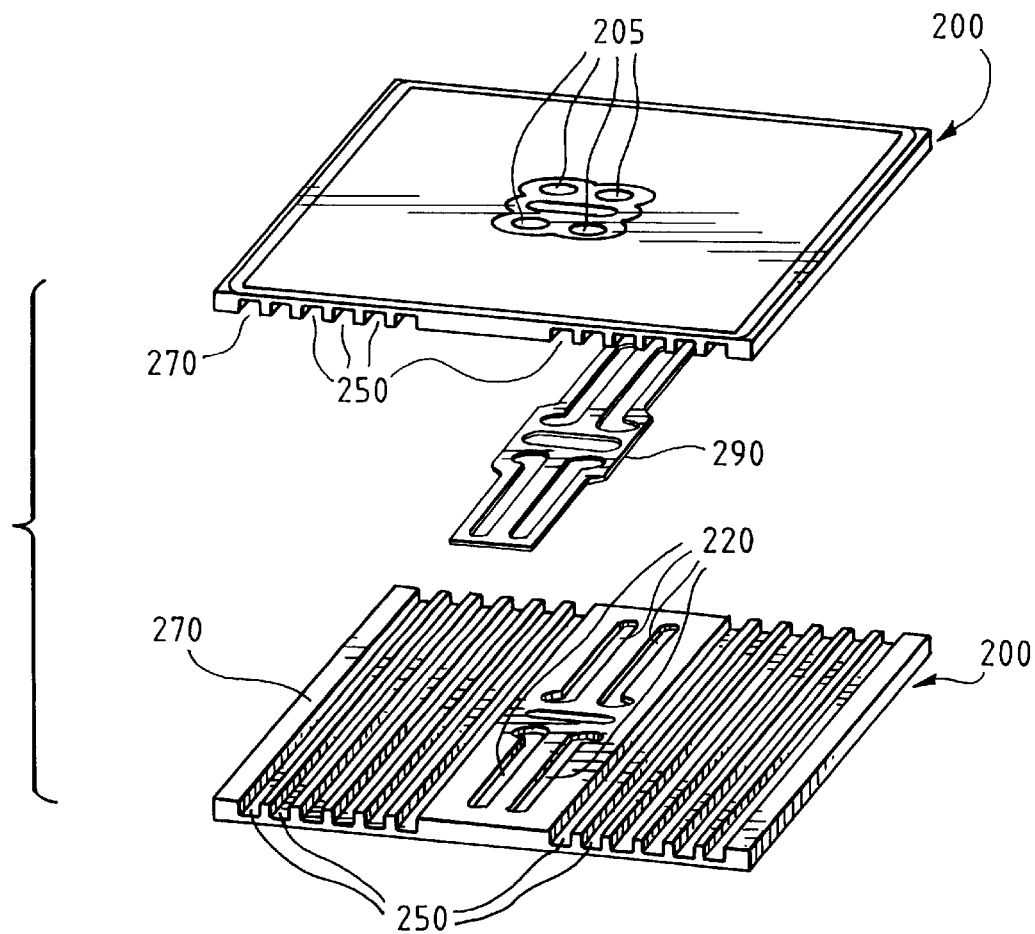
FIG. 4 is an exploded perspective view of an adjoining pair of separator plates with a gasket interposed between the non-active surfaces thereof

FIG. 4 shows in an exploded view, how adjoining non-active surfaces 270 of taco separator plates 200 may be assembled together. In the embodiment shown in FIG. 4, a gasket 290 is used to seal around manifold openings 205 and reactant supply/exhaust channels 220 to prevent leakage and intermixing of the fuel and oxidant stream and coolant which are all in contact with the adjoining non-active surfaces 270 of both plates.

In another embodiment, an adhesive may be used to bond the non-active surfaces of adjoining separator plates 200 together, without a gasket. Thus supply/exhaust channels 220 and cooling channels 250 are fluidly sealed where the adhesive bonds the adjoining plates together. The adhesive may be applied only where sealing is desired. To improve electrical conductivity between adjoining plates, the adhesive may be electrically conductive. For example, the adhesive compound may comprise electrically conductive particles.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An electrochemical fuel cell stack comprising:
   (a) a plurality of membrane electrode assemblies each comprising an anode, a cathode, and an ion exchange membrane interposed between said anode and cathode;
   (b) a pair of separator plates interposed between adjacent pairs of said plurality of membrane electrode assemblies, said pair of separator plates comprising:
      an anode plate having an active surface contacting an anode, and an oppositely facing non-active surface, and
      a cathode plate having an active surface contacting a cathode, and an oppositely facing non-active surface adjoining said non-active surface of said anode plate; and
   (c) a fuel supply manifold for directing a fuel stream to at least one of said anodes, and an oxidant supply manifold for directing an oxidant stream to at least one of said cathodes, and fuel and oxidant stream passageways fluidly connecting said fuel and oxidant supply manifolds to an anode and a cathode, respectively, wherein said fuel and oxidant stream passageways each traverse a portion of said adjoining non-active surfaces of a pair of said separator plates.

2. The electrochemical fuel cell stack of claim 1 further comprising an oxidant exhaust manifold for directing an oxidant stream from at least one of said cathodes, wherein an oxidant stream passageway fluidly interconnecting said oxidant exhaust manifold to a cathode traverses a portion of adjoining non-active surfaces of a pair of said separator plates.

3. The electrochemical fuel cell stack of claim 1 further comprising a fuel exhaust manifold for directing a fuel stream from at least one of said anodes, wherein a fuel stream passageway fluidly interconnecting said fuel exhaust manifold to an anode traverses a portion of adjoining non-active surfaces of a pair of said separator plates.

4. The electrochemical fuel cell stack of claim 1 wherein passages for a coolant are formed between cooperating non-active surfaces of a pair of said separator plates.

5. The electrochemical fuel cell stack of claim 1 wherein at least one coolant channel is formed in said active surface of at least one of said cathode plates.

6. The electrochemical fuel cell stack of claim 1 wherein at least one coolant channel is formed in said active surface of at least one of said anode plates.

7. The electrochemical fuel cell stack of claim 1 wherein at least one fuel flow field channel is formed in said active surface of each anode plate, said at least one fuel flow field channel capable of distributing a fuel stream from said fuel supply manifold across at least a portion of the contacted anode, and at least one oxidant flow field channel is formed in said active surface of each cathode plate, said at least one oxidant flow field channel capable of distributing an oxidant stream from said oxidant supply manifold across at least a portion of the contacted cathode.

8. The electrochemical fuel cell stack of claim 1 wherein, for each of said pairs of separator plates, said adjoining non-active surfaces of said anode plate and said cathode plate are bonded together.

9. The electrochemical fuel cell stack of claim 8 wherein said adjoining non-active surfaces are bonded together using an electrically conductive adhesive.

10. The electrochemical fuel cell stack of claim 1 wherein said oxidant supply manifold and said fuel supply manifold are internal manifolds comprising aligned openings formed in said plurality of membrane electrode assemblies and said separator plates.

11. The electrochemical fuel cell stack of claim 1 wherein said oxidant supply manifold and said fuel supply manifold are external manifolds extending from an edge face of said fuel cell stack.

12. The electrochemical fuel cell stack of claim 1 wherein said passageways comprise open-faced channels formed in the non-active surface of one plate of said pair of separator plates.

13. The electrochemical fuel cell stack of claim 1 wherein said passageways comprise open-faced channels formed in the non-active surfaces of both plates of said pair of separator plates.

* * * * *

UNITED STATES PATENT AND TRADEMARK OFFICE
CERTIFICATE OF CORRECTION

PATENT NO.   : 6,066,409
DATED         : May 23, 2000
INVENTOR(S)  : J. Ronne, B. Woznicka, C. Chow, H. Voss Page 1 of 1

It is certified that error appears in the above-identified patent and that said Letters Patent is hereby corrected as shown below:

Column 1,
Line 23, under Brief Description of the Drawings, please add a period after the last word in the sentence "thereof ."

Column 1,
Line 45, under Detailed Description of the Preferred Embodiments, please correct a typographical error. The phrase "perimeter seal 10" should be "perimeter seal 110" in order to conform with the drawings.

Signed and Sealed this

Nineteenth Day of March, 2002

Attest:

JAMES E. ROGAN
Attesting Officer  *Director of the United States Patent and Trademark Office*